United States Patent [19]

Steinmann

[11] Patent Number: 4,508,021
[45] Date of Patent: Apr. 2, 1985

[54] VENTILATING ARRANGEMENT

[75] Inventor: Helmut Steinmann, Höllhäuserweg, Fed. Rep. of Germany

[73] Assignee: Robert Bosch GmbH, Stuttgart, Fed. Rep. of Germany

[21] Appl. No.: 503,722

[22] Filed: Jun. 13, 1983

[30] Foreign Application Priority Data

Sep. 23, 1982 [DE] Fed. Rep. of Germany ....... 3235162

[51] Int. Cl.³ .............................................. B60H 1/26
[52] U.S. Cl. .......................................... 98/2.01; 98/2
[58] Field of Search ....................... 98/2.01, 2; 165/40

[56] References Cited

U.S. PATENT DOCUMENTS 3,587,439 6/1971 Mercier ...................................... 98/2
3,845,700 11/1974 Lefeuvre ................................... 98/2

FOREIGN PATENT DOCUMENTS 48104 4/1981 Japan ......................................... 98/2
48201 1/1982 Japan ......................................... 98/2

Primary Examiner—Albert J. Makay
Assistant Examiner—Kwon John
Attorney, Agent, or Firm—Michael J. Striker

[57] ABSTRACT

A ventilating arrangement, particularly an air conditioning arrangement, for a vehicle has an air passage extending from outside into a passenger cabin, and a flow regulating flap associated with the air passage and turnable by an adjusting motor, an impeller located in the air passage and driven by an electric motor with a variable rotary speed, and a pressure measuring element which is connected with the air passage upstream and downstream of a flow resistance arranged in the air passage and formed, for example, as a heat exchanger.

7 Claims, 1 Drawing Figure

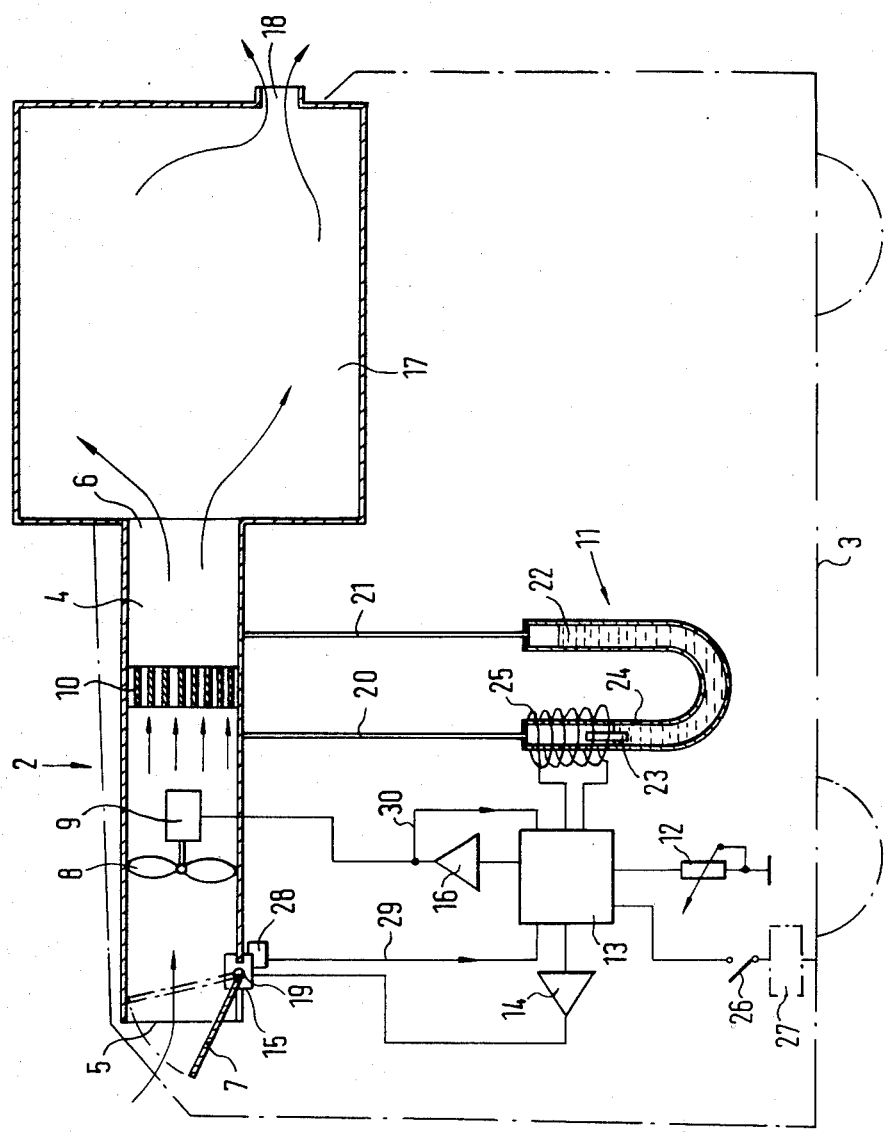

VENTILATING ARRANGEMENT

BACKGROUND OF THE INVENTION

The present invention relates to a ventilating arrangement, particularly an air conditioning arrangement for a vehicle. More particularly, it relates to a ventilating or air conditioning arrangement which has an air passage with an adjustable flow regulating flap, an impeller rotatable with a variable rotary speed, and a pressure measuring element which acts upon the flow regulating flap and changes the rotary speed of the impeller so that, despite differing travel speeds, an air throughput quantity adjusted on a nominal value setter remains substantially the same.

An arrangement of the above mentioned general type is disclosed, for example, in U.S. Pat. No. 3,845,700. In this arrangement an air passage leads from outside into the passage or cabin of the vehicle, a flow regulating flap is built in the air passage, and an impeller driven by an electric motor is also provided. A venturi nozzle is arranged in the front part of the car, and a bellows is connected with the venturi nozzle. It measures the pressure outgoing from the venturi nozzle and acts via a rod onto the regulating flap and a regulating resistance arranged prior to the electric motor. This rod is formed so that, starting from its position with immovable vehicles in which the regulating resistance is bridged and the flow regulating flap is maximum opened, it increasingly connects in a first movement region with constantly open flap the regulating resistance to the current supply of the electric motor. When the regulating resistance is completely turned on, the rod is retained rigid relative to the flow regulating flap so that in the subsequent moving region with increasing vehicle speed the flap is progressively closed. This ventilating arrangement retains the air throughput substantially constant. The air throughput is selected manually with the aid of a threaded spindle which changes the length of the rod. The disadvantage of this construction is that the venturi nozzle is remote from the inlet of the air passage. Such an arrangement is not implemented in the vehicle industry. Moreover, further difficulties are expected when a water cooler for the motor is arranged in the vehicle in the vicinity of the venturi nozzle, and a cooling ventilator with an arbitrarily variable rotary speed is provided. The turning on or turning off, or the variation of the rotary speed of the ventilator influences the inflow speed of air in the front part of the vehicle. For attaining a sufficiently accurate adjustment of the regulating flap, the bellows must be formed voluminously, which makes difficult its placement in the vehicle.

U.S. Pat. No. 3,587,439 discloses also such a ventilating arrangement with a bellows and uses an electric driving element for the regulating flap.

SUMMARY OF THE INVENTION

Accordingly, it is an object of the present invention to provide a ventilating arrangement, and more particularly an air conditioning arrangement, for a vehicle which avoids the disadvantages of the prior art.

More particularly, it is an object of the present invention to provide a ventilating arrangement, particularly an air conditioning arrangement, which measures directly the air throughput to the passenger cabin and avoids from the beginning adjusting works which are unavoidable in building-in of the known arrangements in different types of vehicles.

It is another object of the present invention to provide a ventilating arrangement, and particularly an air conditioning arrangement, which has a considerably higher regulating accuracy, since it is measured by a simple differential measuring whether the air throughput through the air passage deviates or not from a preselected value.

The additional energy consumption for the electric transfer of the actual pressure measured values and their processing plays a subordinate role, especially when an electronic device, for example with a processor, is used for regulating the temperature of the throughgoing air. In this case the task of controlling the regulating flap and the rotary speed of the motor is transferred to the processor.

In keeping with these objects and with others which will become apparent hereinafter, one feature of the present invention resides, briefly stated, in a ventilating arrangement, particularly an air conditioning arrangement for a vehicle, in which a pressure measuring element acting upon a flow regulating flap and changing the rotary speed of an impeller is formed as a differential pressure meter and has two connecting members connected with an air passage extending from outside into the vehicle cabin upstream and downstream of a flow resistance part in the air passage, respectively.

Another feature of the present invention is that the flow resistance part is formed as a heat exchanger arranged inside the air passage. When the arrangement is designed in accordance with these features, it provides, without additional flow loss, such a great pressure differential on the pressure differential meter that it does not require a high sensitivity and can be manufactured in price-economical manner.

Still another feature of the present invention is that the pressure measuring element of the arrangement is formed as a U-pipe manometer and has an electric measured value transmitter. These features provide a practical implementation of the arrangement.

A further feature of the present invention is that the arrangement has a regulator arranged so that the nominal value setter and the measured value transmitter are connected with the regulator, and the regulator is arranged so as to turn on the impeller only when the flow regulating flap is open and to adjust the flow regulating flap only when the impeller is turned off. More particularly, the regulating switches on the electric motor of the impeller when the flow regulating flap is open and adjusts the flow regulating flap only when the electric motor is switched off. When the arrangement is designed in accordance with these features, it has the advantage that the stream for the impeller used only when the complete opening of the regulating flap is not sufficient for maintaining a predetermined or preselected air throughput, and the motor of the impeller, for example in the event of high impact pressure, is not overloaded and destroyed.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view showing a ventilating or air conditioning arrangement for a vehicle, in accordance with the present invention.

DESCRIPTION OF THE PREFERRED EMBODIMENTS

A ventilating arrangement, particularly an air conditioning arrangement, is identified as a whole with reference numeral 2 and is built in a vehicle 3.

The arrangement 2 has an air passage 4 with an inlet 5 and an outlet 6. The air passage 4 is also provided with a flow control flap 7, an impeller 8 driven by an electric motor 9, and a heat exchanger 10. The arrangement further has a pressure meter 11, a nominal value setter 12, a regulator 13, an amplifier 14, an adjusting motor 15, and a second amplifier 16.

The vehicle is for example a passenger power vehicle with a passenger cabin 17. The outlet 6 of the air passage 4 opens into the passenger cabin 17. The passenger cabin 17 has in a known manner at least one ventilating opening 18. The inlet 5 of the air passage 4 opens for example in front of a not shown windshield of the vehicle 3 into the surroundings.

In the illustrated embodiment, the flow regulating flap 7 is formed as a pivotable flap which is connected with a drive shaft 19 of the adjusting motor 15 for joint rotation therewith. The flow regulating flap 7 is adjustable so that, on the one hand, it hinders the inflow of the air into the air passage as little as possible, and on the other hand can at least approximately close the inlet passage 5. The impeller 8 is arranged inside the air passage so that it aspirates air through the inlet 5 and pumps air through the heat exchanger 10 and the outlet 6 into the passenger cabin 17. The ventilating opening 18 in the passenger cabin 17 is provided so as to enable formation inside the air passage 4 of a permanent air flow.

The heat exchanger 10 can be formed in a known manner as a heat exchanger for heating or cooling the air or for alternating heating and cooling of the air. Upstream of the heat exchanger 10, as considered in the flow direction of air, a connecting conduit 20 is attached to the air passage 4. A further connecting conduit 21 opens downstream of the heat exchanger 10 into the air passage 4. The pressure meter 11 is formed as a U-pipe-manometer with which the above mentioned connecting conduits 20 and 21 are connected, and is at least partially filled with a liquid. A float immersed in the liquid 22 is located inside the pressure meter 11.

The liquid can be for example oil or mercury. The float is composed of a material or contains such a material which is suitable for the flow of magnetic field lines. For the case when the liquid 22 is mercury, the float can be composed of an iron piece. An induction coil 25 is arranged in the region of movement of the float 23 on one leg 24 of the U-pipe-manometer. The induction coil 25 is connected with the regulator 13 and is supplied during the operation of the arrangement 2 with an alternating current from the regulator 13. The regulator 13 is supplied, in turn, via a switch 26 from a board network 27 of the vehicle 3.

Depending upon the pressure difference between the connecting conduits 20 and 21, the float 23 assumes different heights inside the leg 24. The different heights of this float inside the induction coil 25 cause changes in the inductivity of the latter. The respective value of the inductivity and/or its change is measured by the regulator 13 and compared with a nominal value. The nominal value is adjusted on the nominal value setter 12 manually. The regulator includes a not shown known comparator and a priority circuit connected therewith which is also not shown. The amplifier 14 and the amplifier 16 are connected with the same. The amplifiers 14 and 16 obtain electrical auxiliary energy also from the board network 27 of the vehicle 3.

In condition of immovable vehicle 3 and no wind and with the open switch 26, identical pressure develops in both connecting conduits 20 and 21, and the float 23 assumes an initial position causing a predetermined value of the inductivity of the induction coil 25. Assuming that the nominal value setter 12 has an adjustment for a certain air flow through the passenger cabin, then with closing of the switch 26 the comparator, as is the case in the immovable vehicle and non-operating impeller 8, determines unbalance and gives a signal to the above mentioned primary circuit. An indicating conductor 29 extends to this primary circuit from a control indicator 28 mounted on the adjusting motor 15, and a further indicating conductor 30 also leads to the primary circuit from the motor 9. The primary circuit is designed so that, with the non-operating motor 9, when the indicating conductor 30 passes no voltage which can be connected with a motor drive current, the comparator acts onto the amplifier 14 so that the latter gives a voltage to the adjusting motor 15 which results in opening of the flow regulating flap 7. The regulating flap 7 is increasingly opened, and this conducted to the primary circuit with the aid of the control indicator 28 via the indicating conductor 29. When the flow regulating flap 7 reaches its position "completely open", the primary circuit interrupts the control signal to the amplifier 14 and switches on the amplifier 16. The amplifier 16 turns the electric motor 9 of the impeller 8 into operation. During rotation of the impeller, an air stream is generated through the air passage 4 and the heat exchanger 10. The heat exchanger 10 forms, on the one hand, a flow resisting path inside the air passage 4 and, on the other hand, a narrowing of the cross section of the air passage 4 at the location of its mounting. As a result of this, the air pressure in the connecting conduit 20 is greater than the air pressure in the connecting conduit 21. This pressure difference provides for lowering of the float 23 and respectively changing of the inductivity of the induction coil 25. In correspondence with this, a changed measuring voltage takes place at the comparator of the regulator 13. As long as this changed measuring voltage do not coincide with the voltage obtained with the aid of the nominal value setter 12, the comparator acts onto the amplifier 16 so that the rotary speed of the motor 9 and the throughput of the impeller 8 further increase. Finally, the pressure before the heat exchanger 10 increases so that the float 23 travels downwardly so far that it causes the comparator to reduce via the amplifier 16 the current through the motor 9. When this happens, the air quantity flowing through the air passage 4 corresponds to the quantity set by the nominal value setter 12.

When the vehicle accelerates and/or is driven in a headwind, the rotary speed of the impeller 8 is further reduced in accordance with the above mentioned manner. Finally, there can be a case when the motor 9 is no longer driven, since no drivingly acting current is given from the amplifier 16. When no voltage indicating motor operation is present in the indicating conduit 30.

This is indicated in the primary circuit. Therefore it connects the comparator with the amplifier 14, so that in the case of too high a pressure in the connecting conduit 20, the start of the adjusting motor 15 acts in such a manner that the flow regulating flap 7 moves from its position "completely open" in closing direction. This results in a throttling which counteracts the impact pressure because of the velocity in blower stream, which interrupts the inlet 5. This provides a reduction of the suppply of air through the air passage 4. Thereby the pressure in the connecting conduit 20 begins to drop. Finally, the comparator recognizes that the voltage given from the induction coil 25 coincides with the nominal value. The comparator therefore stops the adjustment of the flow regulating flap 7.

When the vehicle 3 is now braked or driven in direction of a headwind, the impact pressure onto the inlet 5 decreases and the float 23 begins to rise in the induction coil 25. The comparator controls now the amplifier 14 so that the latter drives a stream which is opposite to the above mentioned control example, through the adjusting motor 15. The adjusting motor 15 turns the flow regulating flap in direction "completely open" for such a long time until the comparator does not recognize any deviation from the nominal value. When by further reduction of the travel speed finally the flow regulating flap 7 is turned to its position "completely open", the control indicator 28 indicates the attainment of this position via the conductor 29 on the primary circuit. The primary circuit connects the comparator with the amplifier 16, so that during a further pressure drop in the connecting conduit 20 the first described control process again takes place.

Instead of the U-pipe-manometer 11 with inductive measurement transfer, a pressure cell provided with a membrane can be used. Resistive strain gauges can be arranged on this membrane for electric measured value transfer. When the resistive strain gauges which are connected with one another in a measuring bridge are supplied with direct current, it is possible when the nominal value setter is formed as a primary circuit in the above mentioned example, to form the comparator in a simple manner with the use of a commercial operational amplifier.

The mounting space which is determined by the designer for the respective vehicle type can require differently shaped and extending air passages 4. In a very narrow space condition, the air passage can be bent once or several times. Such avoidable bending causes flow resistance. This flow resistance can be used, when the heat exchanger 10 is connected directly with the same, for increasing the measured signals. It is, however, necessary to connect the connecting conduits 20 and 21 so that they are offset on the air passage 4. It is also possible with the utilization of sensitive pressure meters to use other resistance members than the heat exchanger 10 for measuring the throughput quantity. On the grounds of space, instead of a flow regulating flap 7, two oppositely rotating flaps can be used which together can close the cross section of the inlet 5.

It will be understood that each of the elements described above, or two or more together, may also find a useful application in other types of constructions differing from the types described above.

While the invention has been illustrated and described as embodied in a ventilating arrangement, particularly an air conditioning arrangement, for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A ventilating arrangement, particularly an air conditioning arrangement for a vehicle having a cabin, comprising
an air passage extending from outside into a vehicle cabin;
an adjustable flow regulating flap associated with said air passage;
an impeller rotatable in said passage with a variable number of revolutions;
a flow resistance part provided in said air passage;
a nominal value setter for adjusting a nominal value of air throughput; and
a pressure measuring element arranged to act onto said flow regulating flap and to change the rotary speed of said impeller so that despite differing travel speeds an air throughput adjusted on said nominal value setter remains substantially the same, said pressure measuring element being formed as a differential pressure meter and having two connecting members arranged so that one of said connecting members is connected with said air passage upstream of said flow resistance part, whereas the other of said connecting members is connected with said air passage downstream of said flow resistance part.

2. A ventilating arrangement as defined in claim 1; and further comprising an adjusting motor operative for adjusting said flow regulating flap, said pressure measuring element being arranged to act upon said adjusting motor of said flow regulating flap.

3. A ventilating arrangement as defined in claim 1; and further comprising an electric motor with variable rotary speed for driving said impeller, said pressure measuring element being arranged to act upon said electric motor of said impeller.

4. A ventilating arrangement as defined in claim 1, wherein said flow resistance part is formed by a heat exchanger arranged inside said air passage.

5. A ventilating arrangement as defined in claim 1, wherein said pressure measuring element is formed as a U-pipe manometer and has an electric measured value transmitter.

6. A ventilating arrangement as defined in claim 5; and further comprising a regulator arranged so that said nominal value setter and said measured value transmitter are connected with said regulator, said regulator being arranged so as to turn on said impeller only when said flow regulating flap is open and to adjust said flow regulating flap only when said impeller is turned off.

7. A ventilating arrangement as defined in claim 6; and further comprising an electric motor with variable rotary speed for driving said impeller, said regulator being arranged so as to switch on said electric motor only when said flow regulating flap is open and to adjust said flow regulating flap only when said electric motor is switched off.

* * * * *